United States Patent
Turner et al.

(10) Patent No.: US 8,579,356 B2
(45) Date of Patent: Nov. 12, 2013

(54) ATTACHMENT FOR AIR SPLITTER PANEL

(75) Inventors: Phillip M. Turner, Montrose, MI (US); Russell J. Peyerk, Romeo, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 14 days.

(21) Appl. No.: 13/339,726

(22) Filed: Dec. 29, 2011

(65) Prior Publication Data

US 2013/0168998 A1 Jul. 4, 2013

(51) Int. Cl.
*B60J 9/04* (2006.01)

(52) U.S. Cl.
USPC ........................................... 296/180.1

(58) Field of Classification Search
USPC ............... 296/180.1–180.5, 29; 293/154, 155
See application file for complete search history.

(56) References Cited

U.S. PATENT DOCUMENTS

| | | | | |
|---|---|---|---|---|
| 5,108,138 A * | 4/1992 | Kawaguchi | ................... | 293/120 |
| 5,338,077 A * | 8/1994 | Haberle et al. | ................ | 293/120 |
| 5,988,714 A * | 11/1999 | Akazawa et al. | ............. | 293/155 |
| 6,010,169 A * | 1/2000 | Cox et al. | ....................... | 293/120 |
| 6,520,553 B2 * | 2/2003 | Muramatsu | .................... | 293/155 |
| 6,644,700 B2 * | 11/2003 | Ito et al. | ........................ | 293/117 |
| 6,948,753 B2 * | 9/2005 | Yoshida et al. | .............. | 296/1.08 |
| 6,964,441 B2 * | 11/2005 | Ariga et al. | .................... | 293/117 |
| 7,399,024 B2 * | 7/2008 | Ordonio et al. | ............ | 296/180.1 |
| 8,020,905 B2 * | 9/2011 | Nakayama | ..................... | 293/115 |
| 8,356,856 B2 * | 1/2013 | Danev | ........................ | 296/180.1 |

* cited by examiner

*Primary Examiner* — H Gutman

(57) ABSTRACT

An air splitter panel is attached to a vehicle fascia panel. One of the panels has a plurality of longitudinal extending slots and the other of the panels has a plurality of fastener holes that register with the slots. Fasteners are mounted in each of the holes and extend through the slot registered therewith to attach the panels together while permitting sliding movement of the splitter panel relative to the fascia panel. A yieldable detent acts between the fastener and the one of the panels with the slot to block the sliding movement of the splitter panel until a force applied upon the splitter panel overcomes the yieldable detent to permit the sliding movement of the splitter panel.

20 Claims, 3 Drawing Sheets

ATTACHMENT FOR AIR SPLITTER PANEL

FIELD OF THE INVENTION

The present invention relates to the front end structure of a motor vehicle and more particularly provides an attachment of an air splitter panel to a vehicle fascia panel that permits sliding movement of the air splitter panel upon occurrence of an impact load, as well as facilitating repair and replacement of the air splitter panel.

BACKGROUND OF THE INVENTION

Modern motor vehicles have a front end fascia panel that conceals a bumper bar and energy absorber. It is known to attach an air splitter panel beneath the fascia panel. The air splitter panel is shaped to split the oncoming air stream for aerodynamic flow. The air splitter panel is the lowermost portion of the front end structure of the vehicle and is therefore susceptible to impact against a curb or other obstruction.

It would be desirable to provide an improved attachment of the air splitter panel to a vehicle fascia so as to minimize the possible damage to the air splitter panel, and also facilitate the repair or replacement of the air splitter panel if damaged by impact against a curb or other obstruction.

SUMMARY OF THE INVENTION

An air splitter panel is attached to a vehicle fascia panel. One of the panels has a plurality of longitudinal extending slots and the other of the panels has a plurality of fastener holes that register with the slots. Fasteners are mounted in each of the holes and extend through the slot registered therewith to attach the panels together and permit sliding movement of the splitter panel relative to the fascia panel. A yieldable detent acts between the fastener and the one of the panels with the slot to block the sliding movement of the splitter panel until a force applied upon the splitter panel overcomes the yieldable detent to permit the sliding movement of the splitter panel.

Further areas of applicability of the present invention will become apparent from the detailed description provided hereinafter. It should be understood that the detailed description and specific examples, while indicating exemplary embodiments of the invention, are intended for purposes of illustration only and do not limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of certain exemplary embodiments is merely exemplary in nature and is not intended to limit the invention, its application, or uses.

Figure 1:
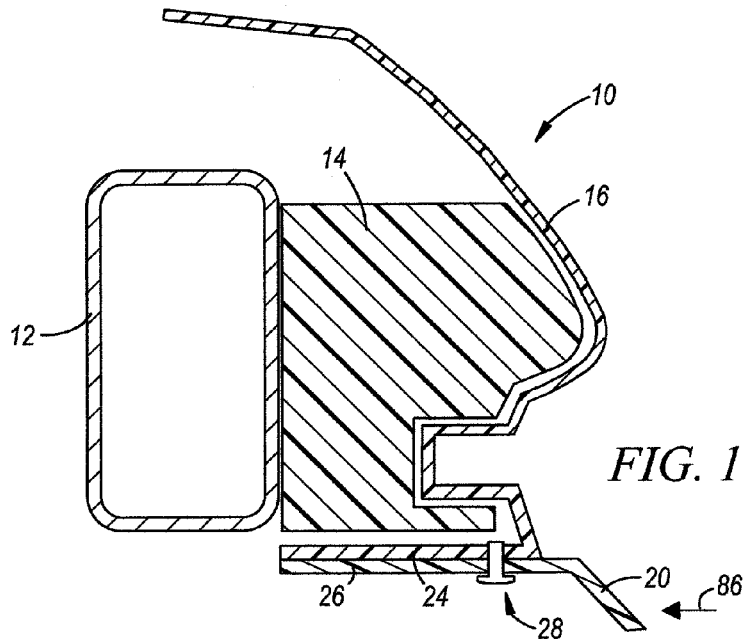
FIG. 1 is a section view taken through the front end structure of a motor vehicle showing a splitter panel attached to a vehicle fascia panel.

In FIG. 1, the front end structure 10 of a motor vehicle includes a bumper beam 12, an energy absorber 14 positioned forwardly of the bumper beam 12, and a fascia panel 16 that overlies the bumper beam 12 and energy absorber 14. The bumper beam 12 is suitably attached to the vehicle frame structure. The energy absorber 14 is typically a molded plastic or foam structure supported on the bumper beam 12, and will yield in event of front impact load to absorb energy. The fascia panel 16 is a plastic panel with an aesthetically pleasing surface treatment and serves as the exterior of the motor vehicle.

FIG. 1 also shows a splitter panel 20 that is mounted on the motor vehicle front end structure 10. The splitter panel 20 is of molded plastic construction and is designed to improve the styling aesthetic of the vehicle and also improve the aerodynamics of the vehicle by splitting the oncoming airflow into left and right air streams that will smoothly pass around the sides of the vehicle. Although the splitter panel 20 could be molded integrally with the fascia panel 16, it will be recognized that the splitter panel 20 is the lowermost and forwardmost part of the vehicle and therefore can be susceptible to damage by impact with parking lot curbs and other obstacles. Accordingly, it is desirable that the splitter panel 20 be a separate panel that is attached to the fascia panel 16 by fasteners so that the splitter panel 20 can be replaced without requiring replacement of the larger and more costly fascia panel 16.

Figure 2:
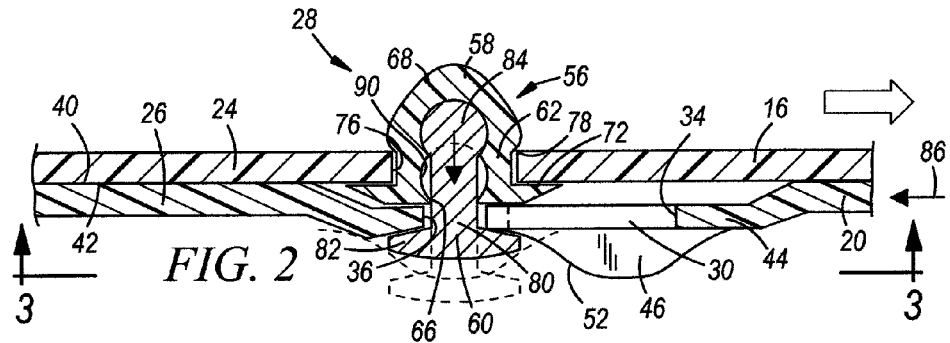
FIG. 2 is an enlargement of a portion of FIG. 1 showing a fastener and yieldable detent acting between the splitter panel and the fascia panel.
Figure 3:
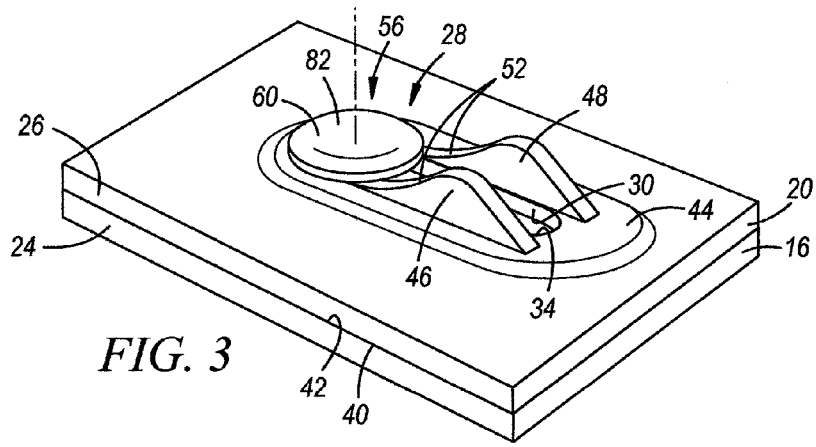
FIG. 3 is a perspective view taken in the direction of arrows 3-3 of the fastener and yieldable detent of FIG. 2.

Referring to FIGS. 1, 2, and 3, the lower edge of the fascia panel 16 is defined by a longitudinal extending fascia wall 24. The splitter panel 20 has a longitudinal extending splitter wall 26 that underlies and engages the fascia wall 24.

An attachment system includes a plurality of fasteners, one of which is generally indicated at 28, for attaching the splitter wall 26 to the fascia wall 24 in a manner that will permit the splitter panel 20 to travel rearwardly relative the fascia panel 16 in the event of a frontal load that exceeds a certain threshold. The drawings herein show one of fasteners, it being understood that a plurality of such fasteners are provided at spaced intervals across the front end structure 10 of the vehicle.

As seen in FIGS. 2 and 3, a longitudinal extending slot 30 is provided in the splitter wall 26. The slot 30 has a forward end 34 and a rearward end 36. The splitter wall 26 has an upper surface 40 that engages with a bottom surface 42 of the fascia wall 24. A depressed wall portion 44 of the splitter wall 26 surrounding the slot 30 is depressed away from engagement with the bottom surface 42. A pair of ramps, 46 and 48, depend downwardly from the splitter wall 26 on opposite sides of the slot 30. Each of the ramps 46 and 48 has a ramp surface 52.

A fastener assembly, generally indicated at 56, includes a retainer 58 and a pin 60 to attach the splitter panel 20 to the fascia panel 16 while permitting sliding movement of the splitter panel 20 relative to the fascia panel 16. The retainer 58 is a molded plastic construction and has a hollow stem 62 with an open end 66 and a closed end 68. A retainer flange 72 is provided at the open end 66. The fascia panel 16 has a hole 76 that registers with the slot 30 of the splitter panel 20. As seen in FIG. 2, the closed end 68 of the retainer 58 is inserted through the hole 76 provided in the fascia panel 16, and the retainer flange 72 is seated against the bottom surface 42 of the fascia panel 16. The hollow stem 62 of the retainer 58 has a shoulder 78 that engages the fascia panel 16 to retain the retainer 58. The pin 60 has a shank 80 with a head 82 at one end, and a bulbous enlargement 84 at the other end. As seen in FIG. 2, the shank 80 of the pin 60 is inserted through the slot 30 of the splitter panel 20 and also inserted into the hollow stem 62 of the retainer 58. Accordingly, as seen in FIG. 2, the head 82 of the pin 60 engages with the underside of splitter panel 20 while the bulbous enlargement 84 is captured within the retainer 58. The head 82 of the pin 60 forces the splitter panel 20 upwardly and thereby frictionally clamps the splitter panel 20 against the fascia panel 16. In addition, the pin 60 is captured between the rearward end 36 of the slot 30 and the ramp surfaces 52. The retainer flange 72 of the retainer 58 is accommodated within the depressed wall portion 44 of the splitter panel 20.

Normally, the pin 60 will retain the splitter panel 20 at its position of FIG. 2. However, in the event of a sufficiently large force being applied to the splitter panel 20 in the direction of arrow 86, the splitter panel 20 will be forced to slide rearward as permitted by the length of the slot 30. The ramp surfaces 52 of the ramps 46 and 48 engage with the head 82 of pin 60, causing the pin 60 to be withdrawn downwardly within the hollow stem 62 of the retainer 58 to the phantom line indicated position of FIG. 2. Thus, although the pin 60 is continuing to attach the splitter panel 20 to the fascia panel 24, the pin 60 has been loosened with respect to the splitter panel 20 so that the splitter panel 20 is allowed to move rearward until the forward end 34 of the slot 30 comes into engagement with the shank 80 of the pin 60.

Thus, the combination of the retainer 58 and pin 60, and the ramps 46 and 48, cooperate to define a yieldable detent to block the sliding movement of the splitter panel 20 until a force applied upon the splitter panel 20 overcomes the yieldable detent. The magnitude of force that will initiate the sliding movement of the splitter panel 20 will be determined by the tenacity of the capture of the bulbous enlargement 84 within the retainer 58, and by the angle of the ramp surface 52. The retainer 58 can be a relatively flexible material so that the retainer 58 will flex to accommodate the capture and movement of the bulbous enlargement 84 within the retainer 58. Alternatively, the retainer 58 can have a secondary cavity 90 molded therein to receive the bulbous enlargement 84 upon the downward withdrawal of the pin 60. Although the drawings herein show the slot 30 provided in the splitter panel 20, the slot 30 can alternatively be provided in the fascia panel 16 and the retainer 58 can be mounted in a hole provided in the splitter panel 20.

After the occurrence of the rearward sliding movement of the splitter panel 20, the splitter panel 20 can be repositioned by forcibly sliding the splitter panel 20 forwardly and reinserting the pin 60 upwardly into the retainer 58. However, if the splitter panel 20 has been injured, a new splitter panel 20 can be readily installed onto the fascia panel 16 by either reusing or replacing the fastener assembly 56.

Figure 4:
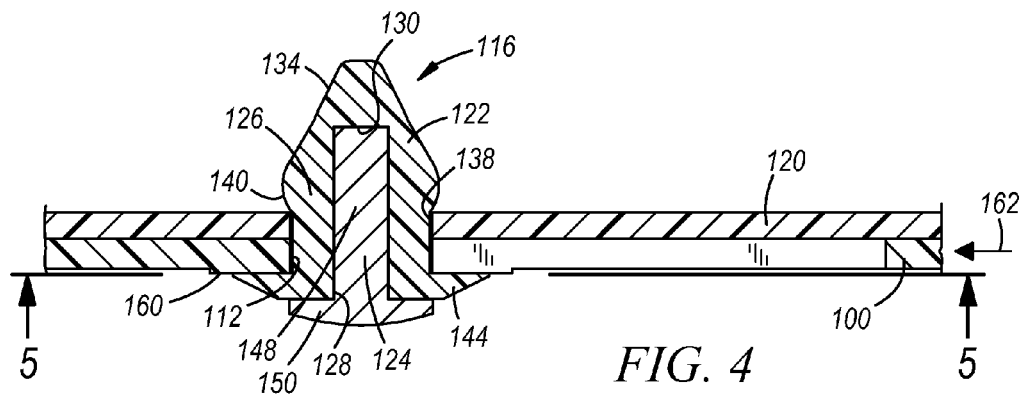
FIG. 4 is a section view similar to FIG. 2 but showing a second embodiment of the invention.
Figure 5:
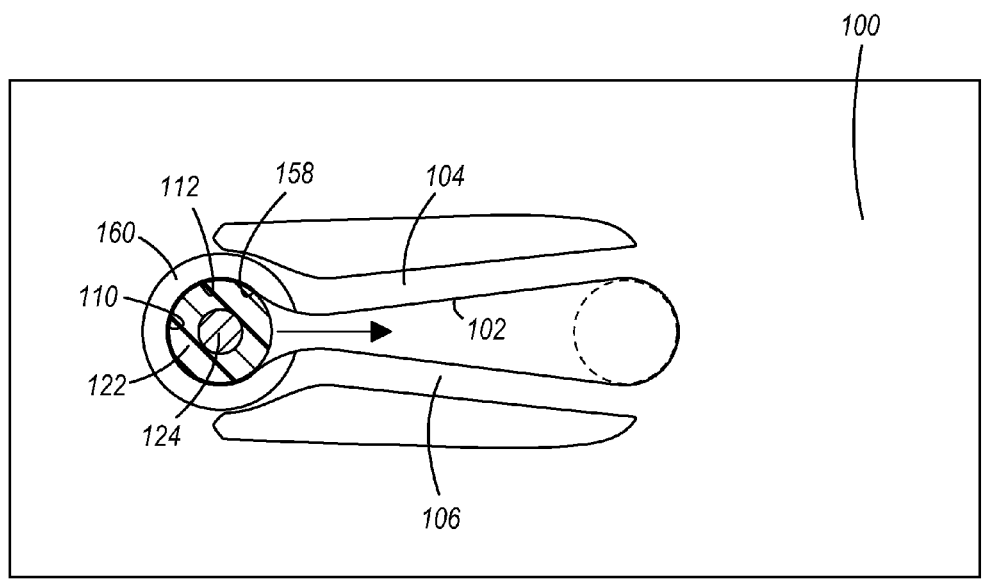
FIG. 5 is a plan view taken in the direction of arrows 5-5 of FIG. 4.

FIGS. 4 and 5 show a second embodiment of the invention. As seen in FIG. 5, splitter panel 100 has a longitudinal extending slot 102 defined by laterally spaced flexible walls 104 and 106. The rearward end 110 of the slot 102 has a circular opening 112. As seen in FIG. 4, fastener assembly 116 attaches the splitter panel 100 to the underside of a fascia panel 120. The fastener assembly 116 includes a retainer 122 and a pin 124. The retainer 122 includes a hollow stem 126 with an open end 128 and a closed end 130. The closed end 130 is preferably tapered at 134 to facilitate the insertion of the retainer 122 through the circular opening 112 of the slot 102 and then through a circular hole 138 provided in the fascia panel 120. The closed end 130 has shoulders 140 that engage the fascia panel 120, and the open end 128 has a retainer flange 144 that engages with the splitter panel 100. Pin 124 includes a shank 148 and a head 150. The shank 148 of pin 124 is inserted within the hollow stem 126 of the retainer 122 to maintain the retainer 122 in its radially expanded condition of FIG. 4, thus assuring that the retainer 122 remains in place to provide an assured attachment between the splitter panel 100 and the fascia panel 120.

The slot 102 of the splitter panel 100 includes a necked down wall portion 158 of each of the laterally spaced flexible walls 104 and 106 that engages with the hollow stem 126 of the retainer to block and prevent a leftward movement of the splitter panel 100 relative to the retainer 122 and the fascia panel 120. However, upon the occurrence of a force acting on the splitter panel 100 in the direction of arrow 162, the laterally spaced flexible walls 104 and 106 that define the slot 102 can spread apart, allowing the necked down wall portion 158 to slide leftward about the retainer 122 so that the splitter panel 100 will slide leftward as permitted by the length of the slot 102. Thus, the interaction between the retainer 122 and the necked down wall portion 158 of yieldable walls 104 and 106 cooperate to define a yieldable detent which will normally fix the splitter panel 100 against leftward sliding movement, but will yield and release upon occurrence of a force of sufficient magnitude.

As seen in FIGS. 4 and 5, an integrally molded C-shaped raised boss 160 can be molded integrally around the circular opening 112 to engage with the retainer flange 144 of pin 124. Then, as the splitter panel 100 moves leftwardly, the raised boss 160 is no longer engaged by the retainer flange 144, and the lesser thickness of the laterally spaced flexible walls 104 and 106 will slide freely between the retainer flange 144 and the underside of the fascia panel 120. Although FIG. 5 shows the slot 102 having a flexible wall extending along both sides of the slot 102, it will be understood that a flexible wall can be provided on only one side of the slot to provide a single necked down wall portion 158 which will block the sliding movement of the splitter panel 100 but yield upon the occurrence of a force applied in the direction of arrow 162. The pin 124 can be eliminated in this embodiment of FIGS. 4-5 if the retainer is sufficiently tenacious to remain seated in the hole 138 without the presence of the pin 124.

After the occurrence of the rearward sliding movement of the splitter panel 100, the splitter panel 100 can be repositioned by forcibly sliding the splitter panel 100 forwardly so that the fastener 116 is once again positioned within the circular opening 112 of the splitter panel 100. However, if the splitter panel 20 has been injured, a new splitter panel 100 can be readily installed onto the fascia panel 120 by either reusing or replacing the fastener assembly 116.

Figure 6:
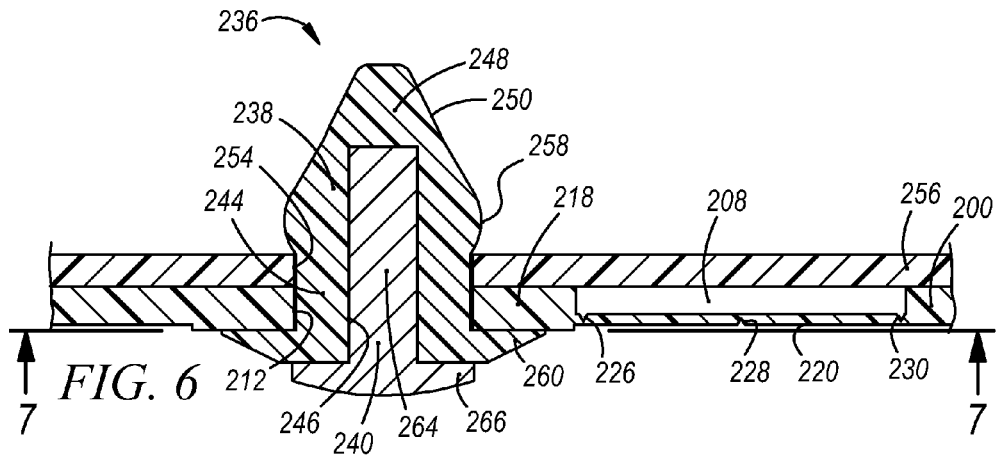
FIG. 6 is a section view similar to FIGS. 2 and 4 but showing a third embodiment of the invention.
Figure 7:
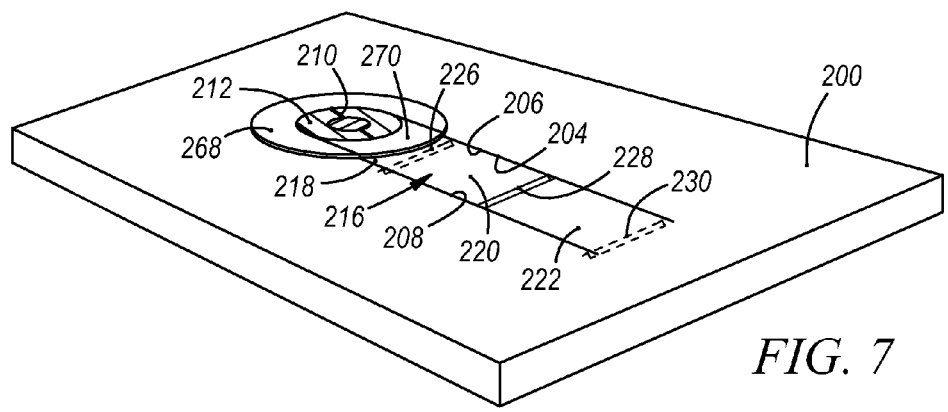
FIG. 7 is a plan view taken in the direction of arrows 7-7 of FIG. 6.
Figure 8:
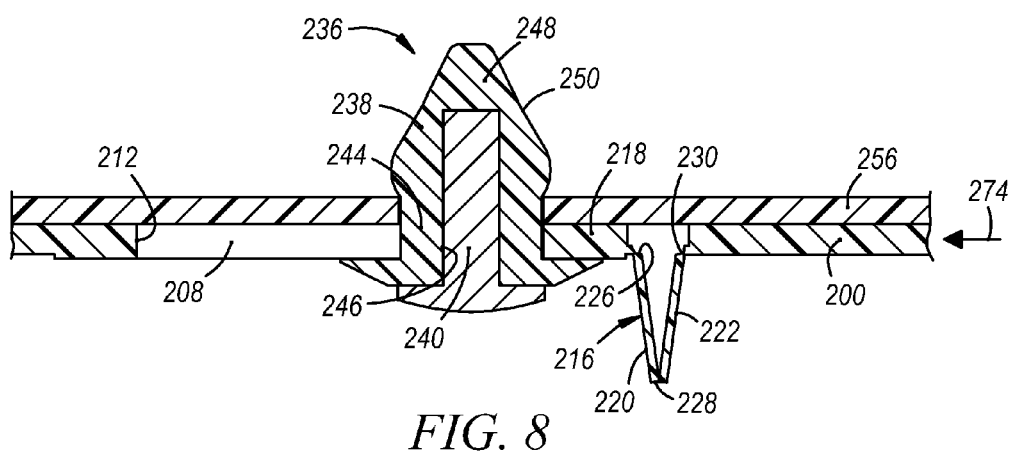
FIG. 8 is a view similar to FIG. 6 but showing the yielding of the yielding detent to permit sliding movement of the splitter panel relative to the fascia panel.

FIGS. 6, 7, and 8 show a third embodiment of the invention. Splitter panel 200 has a longitudinal extending slot 204 having sidewalls 206 and 208. Rearward end 210 of the slot 204 has a circular opening 212. The portion of the slot 204 forwardly of the circular opening 212 is occupied by a collapsible link, generally indicated at 216, which includes a segment 218 and hinge arms 220 and 222. A living hinge 226 connects the segment 218 with the hinge arm 220. A living hinge 228 connects the hinge arms 220 and 222. A living hinge 230 connects the hinge arm 222 to the splitter panel 200. As seen in FIGS. 6 and 7, the hinge arms 220 and 222 are molded to have a normal straightened out condition.

A fastener assembly, generally indicated at 236, includes a retainer 238 and a pin 240. The retainer 238 includes a hollow stem 244 with an open end 246 and a closed and 248. The closed end 248 is preferably tapered at 250 to facilitate the insertion of the retainer 238 through the circular opening 212 of the splitter panel 200 and then through a circular hole 254 provided in fascia panel 256. The closed end 248 has shoulders 258 that engage the fascia panel 256, and the open end 246 has a retainer flange 260 that engages with the splitter panel 200. Pin 240 includes a shank 264 and head 266. The shank 264 of the pin 240 is inserted within the hollow stem 244 of the retainer 238 to maintain the retainer 238 in its radially expanded condition of FIG. 6, thus assuring that the retainer 238 remains in place to provide an assured attachment between the splitter panel 200 and the fascia panel 256.

As best seen in FIG. 7, a C-shaped raised boss 268 is preferably molded in place around the circular opening 212. Likewise a raised boss 270 is molded on the segment 218. The retainer flange 260 of the retainer 238 engages against the raised bosses 268 and 270.

As seen in FIGS. 6 and 7 the segment 218 normally blocks the sliding movement of the splitter panel 200 relative the fascia panel 256. However, upon the occurrence of a force acting on the splitter panel 200 in the direction of arrow 274 in FIG. 8, the splitter panel 200 will slide leftward as permitted by the length of the slot 204. This leftward sliding movement of the splitter panel will be accommodated by the folding up and collapse of the hinge arms 220 and 222 to the position of FIG. 8, permitting the segment 218 to slide along the length of the slot 204 to the position of FIG. 8. Thus, the interaction between the retainer 238 and the folding detent 216 have cooperated to define a yieldable detent mechanism which will normally block the splitter panel 200 against leftward sliding movement, but will yield and release in response to a force of sufficient magnitude. The segment 218 forms a yieldable wall of the slot 204, while in FIGS. 4 and 5, the yieldable walls 104 and 106 provide the yieldable wall.

After the occurrence of the rearward sliding movement of the splitter panel 200, the splitter panel 200 can be repositioned by forcibly sliding the splitter panel 200 forwardly and straightening out the collapsible link 216. However, if the splitter panel 200 has been injured, a new splitter panel 200 can be readily installed onto the fascia panel 256 by either reusing or replacing the fastener assembly 236.

What is claimed is:

1. An attachment for mounting an air splitter panel on a vehicle fascia panel, comprising:
   the splitter panel and the fascia panel engaging one another, one of the panels having at least one longitudinal extending slot;
   the other of the panels having at least one fastener hole that registers with the slot;
   a fastener assembly mounted in the hole and extending through the slot registered therewith to attach the panels together while permitting sliding movement of the splitter panel relative to the fascia panel;
   and a yieldable detent blocking the sliding movement of the splitter panel until a force applied upon the splitter panel overcomes the yieldable detent to permit the sliding movement of the splitter panel.

2. The attachment of claim 1 further comprising the yieldable detent including a ramp provided on the splitter panel that engages with the fastener assembly to loosen the fastener assembly so that the splitter panel is permitted to slide.

3. The attachment of claim 1 further comprising the fastener assembly having a head and the splitter panel having a ramp engaging the head to prevent sliding movement, and the occurrence of a load on the splitter panel causing the ramp to loosen the fastener assembly so that the sliding movement is permitted.

4. The attachment of claim 1 further comprising the slot being provided in the splitter panel, the hole being provided in the fascia panel, the fastener assembly including a retainer engaged within the hole and a pin engaged within a hollow stem of the retainer, said pin having a head engaging the splitter panel, the splitter panel having a ramp engaging the head to prevent sliding movement, the occurrence of a load on the splitter panel causing the ramp to loosen the pin so that the sliding movement is permitted.

5. The attachment of claim 1 further comprising the yieldable detent including the slot having yieldable walls engaging the fastener assembly and the yieldable walls yielding to allow the sliding of the splitter panel.

6. The attachment of claim 1 further comprising the yieldable detent including a collapsible link that blocks the slot and yields to unblock the slot to allow the sliding of the splitter panel.

7. The attachment of claim 1 further comprising the yieldable detent including a collapsible link having a plurality of hinge arms connected by living hinges positioned within the slot, said collapsible link collapsing by pivoting of the hinge arms about the living hinges to permit the sliding of the splitter panel.

8. The attachment of claim 1 further comprising the fastener assembly including a hollow retainer seated in the fastener hole of the one panel and a pin seated within the hollow retainer.

9. The attachment of claim 1 further comprising the plurality of longitudinal extending slots being provided in the splitter panel and the plurality of fastener holes being provided in the fascia panel.

10. The attachment of claim 1 further comprising the one of the panels having a plurality of longitudinal extending slots having a raised boss engaged by a retainer flange, and the raised boss disengaging from the retainer flange upon occurrence of the sliding of the splitter panel.

11. An attachment for mounting an air splitter panel on a vehicle fascia panel, comprising:
   the splitter panel and the fascia panel engaging one another, one of the panels having at least one longitudinal extending slot;
   the other of the panels having at least one fastener hole that registers with the slot;
   a fastener assembly mounted in the hole and extending through the slot registered therewith to clamp the panels together against sliding movement of the splitter panel relative to the fascia panel;
   and a yieldable detent yielding upon occurrence of a force applied upon the splitter panel to permit the sliding movement of the splitter panel, said yieldable detent including a ramp provided on the splitter panel that engages with the fastener assembly to loosen the fastener assembly so that the splitter panel is permitted to slide.

12. The attachment of claim 11 further comprising the fastener assembly having a head and the ramp provided on the splitter panel engages the head to loosen the fastener assembly.

13. The attachment of claim 11 further comprising the slot being provided in the splitter panel, the hole being provided in the fascia panel, the fastener assembly including a retainer engaged within the hole and a pin engaged within a hollow stem of the retainer, said pin having a head engaging the splitter panel, the ramp engaging the head to prevent sliding movement, the occurrence of a load on the splitter panel causing the ramp to loosen the pin within the hollow stem of the retainer so that the sliding movement is permitted.

14. The attachment of claim 13 further comprising the splitter panel having a depressed wall portion surrounding the slot.

15. The attachment of claim 13 further comprising the retainer having shoulders engaging the fascia panel to retain the retainer within the hole of the fascia panel.

16. An attachment for mounting an air splitter panel on a vehicle fascia panel, comprising:
   the splitter panel and the fascia panel engaging one another, one of the panels having at least one longitudinal extending slot;
   the other of the panels having at least one fastener hole that registers with the slot;
   a fastener assembly mounted in the hole and extending through the slot registered therewith to clamp the panels together against sliding movement of the splitter panel relative to the fascia panel;
   and a yieldable detent yielding upon occurrence of a force applied upon the splitter panel to permit the sliding movement of the splitter panel, the yieldable detent including the slot having at least one yieldable wall engaging the fastener assembly, and the yieldable wall yielding on occurrence of the force on the splitter panel to allow the sliding of the splitter panel.

17. The attachment of claim 16 further comprising the yieldable detent including a collapsible link that blocks the slot and yields to unblock the slot to allow the sliding of the splitter panel.

18. The attachment of claim 16 further comprising the yieldable detent including a collapsible link having a plurality of hinge arms connected by living hinges positioned within the slot, said collapsible link collapsing by pivoting of the hinge arms about the living hinges to permit the sliding of the splitter panel.

19. The attachment of claim 16 further comprising the yieldable detent including the longitudinal extending slots having a necked down wall portion thereof engaging with the fastener assembly and yielding upon occurrence of the force to permit the sliding of the splitter panel.

20. The attachment of claim 16 further comprising the yieldable detent including the longitudinal extending slots having yieldable sidewalls defining a necked down wall portion engaging with the fastener assembly, and the sidewalls yielding upon occurrence of the force to permit the sliding of the splitter panel.

* * * * *